(12) United States Patent  (10) Patent No.: US 9,134,901 B2
Cragun  (45) Date of Patent: Sep. 15, 2015

(54) DATA ANALYSIS USING GESTURES

(75) Inventor: Brian John Cragun, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 235 days.

(21) Appl. No.: 13/429,567

(22) Filed: Mar. 26, 2012

(65) Prior Publication Data

US 2013/0254696 A1  Sep. 26, 2013

(51) Int. Cl.
*G06F 3/048* (2013.01)
*G06F 3/0488* (2013.01)
*G06F 3/0484* (2013.01)

(52) U.S. Cl.
CPC ........ *G06F 3/04883* (2013.01); *G06F 3/04842* (2013.01); *G06F 3/04847* (2013.01); *G06F 2203/04808* (2013.01)

(58) Field of Classification Search
CPC .............................. G06F 17/5045; G06F 17/30
See application file for complete search history.

(56) References Cited

U.S. PATENT DOCUMENTS

| 2002/0171664 | A1* | 11/2002 | Prakash et al. ................ 345/611 |
| 2003/0120711 | A1* | 6/2003 | Katz .............................. 709/106 |
| 2004/0139049 | A1* | 7/2004 | Hancock et al. ................... 707/1 |
| 2005/0116966 | A1* | 6/2005 | Graham et al. ................ 345/661 |
| 2006/0041447 | A1* | 2/2006 | Vucina et al. ...................... 705/1 |
| 2009/0021475 | A1* | 1/2009 | Steinle et al. .................. 345/156 |
| 2009/0327975 | A1* | 12/2009 | Stedman ........................ 715/863 |
| 2010/0066691 | A1 | 3/2010 | Li |
| 2010/0156804 | A1* | 6/2010 | Young ............................ 345/173 |
| 2011/0080341 | A1 | 4/2011 | Helmes et al. |
| 2011/0102345 | A1* | 5/2011 | Kim et al. ...................... 345/173 |
| 2011/0115814 | A1* | 5/2011 | Heimendinger et al. ..... 345/619 |
| 2011/0246876 | A1 | 10/2011 | Chutani et al. |
| 2012/0151399 | A1* | 6/2012 | Soerensen et al. ............ 715/769 |

OTHER PUBLICATIONS

Anonymous; Drill Up/Down or In/Out Gesture for Touch Screens, Mar. 24, 2011.
Anonymous; Real-Time Contextual Gesture Guidance, Jan. 13, 2011.
Anonymous; Advanced Video Management Systems, Dec. 22, 2009.

* cited by examiner

*Primary Examiner* — William Bashore
*Assistant Examiner* — Rayeez Chowdhury
(74) *Attorney, Agent, or Firm* — Garg Law Firm, PLLC; Rakesh Garg; William J. Stock

(57) ABSTRACT

In a method for data analysis using gestures, using a first gesture on a graphical representation of a data set, a first dimension is defined. Using the first dimension, a shape is defined on the graphical representation of the data set. A grid segments the graphical representation of the data set into several subsets represented as a several grid blocks. A subset corresponds to a grid block. The shape is a visual shape of the grid block, and the shape serves to define the bounds of the corresponding subset. A second gesture is made relative to a first target grid block in the several grid blocks. In response to the second gesture, a first data analysis computation is performed on a first target subset corresponding to the first target grid block. A result of the first data analysis computation is presented using a hardware device.

18 Claims, 18 Drawing Sheets

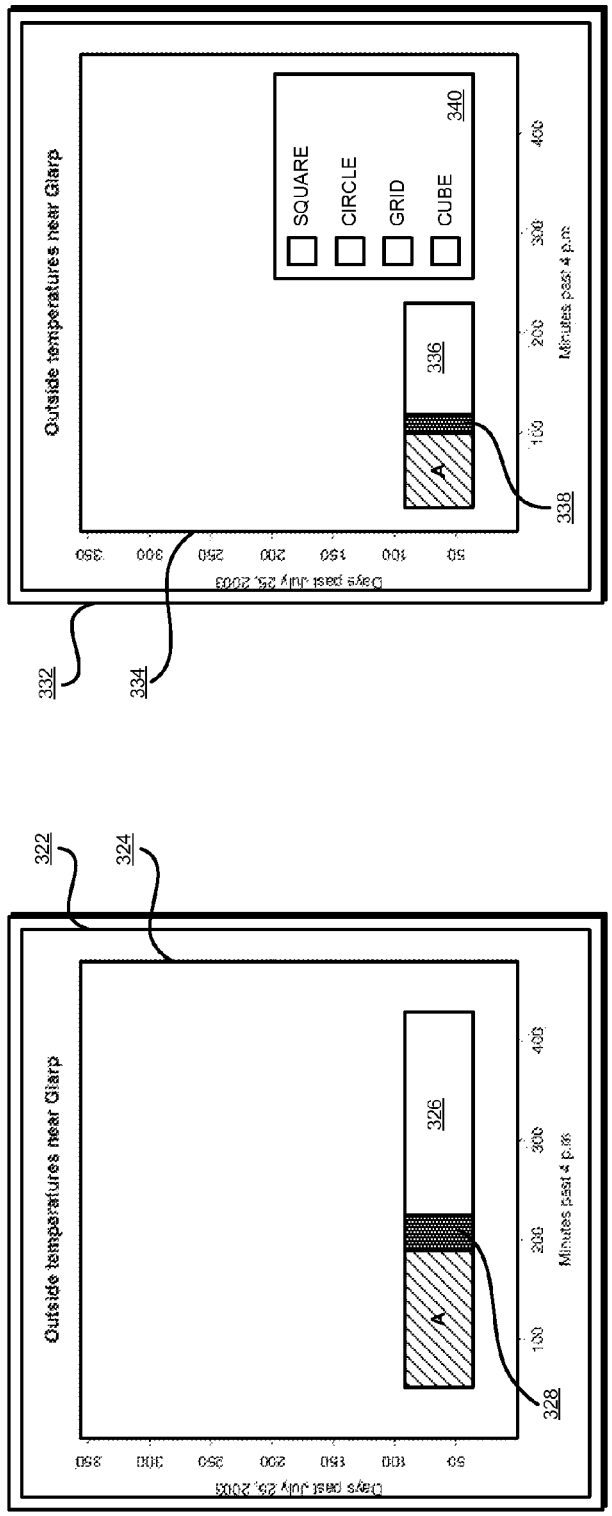

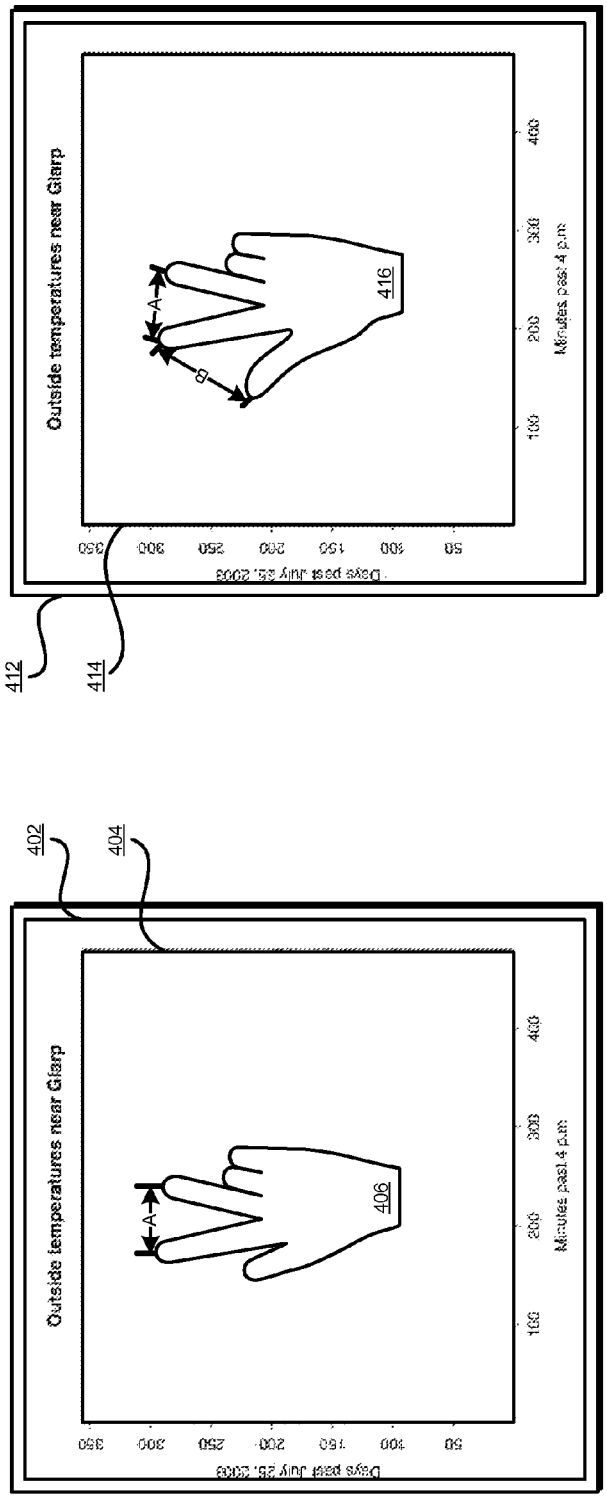

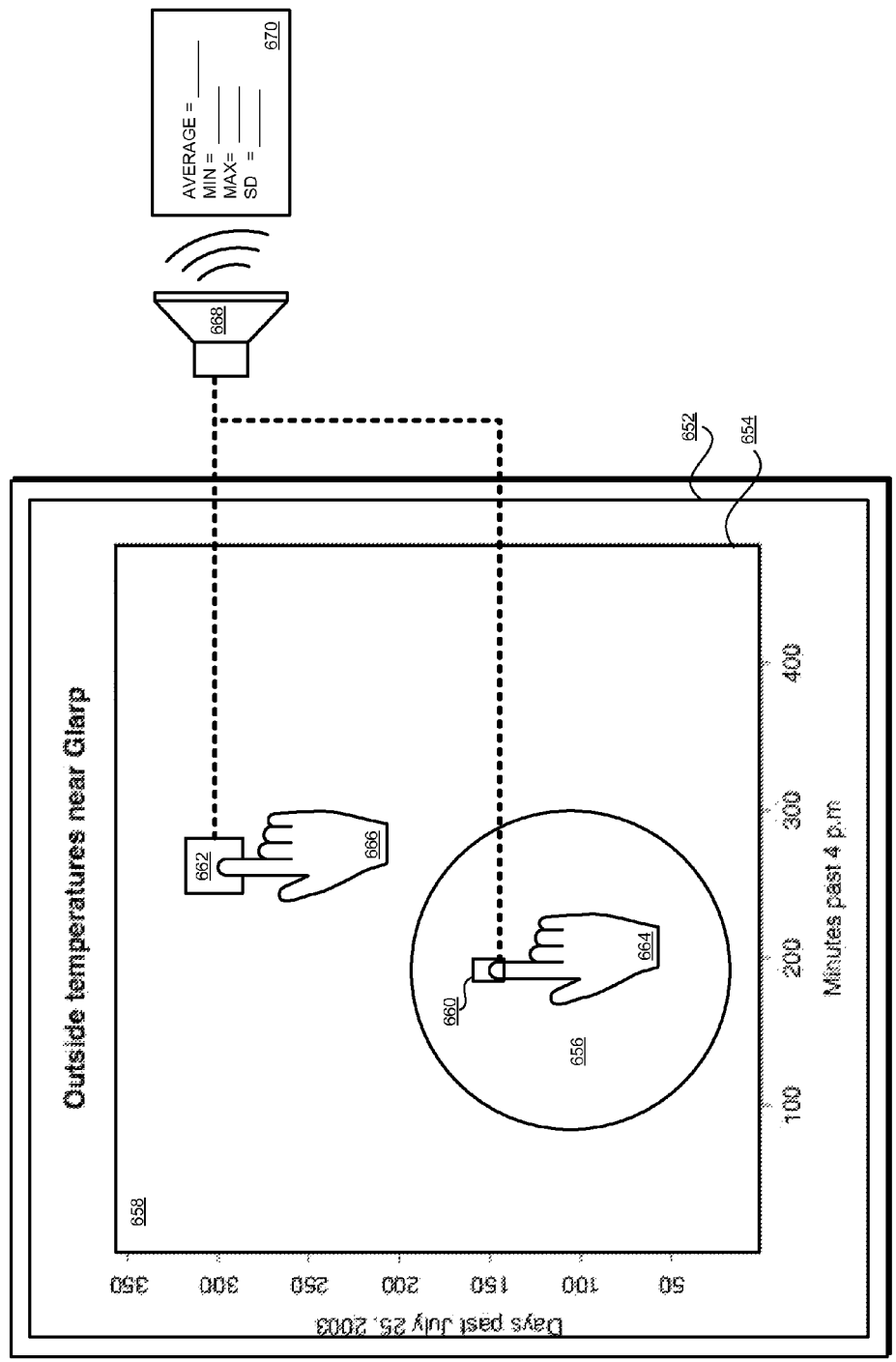

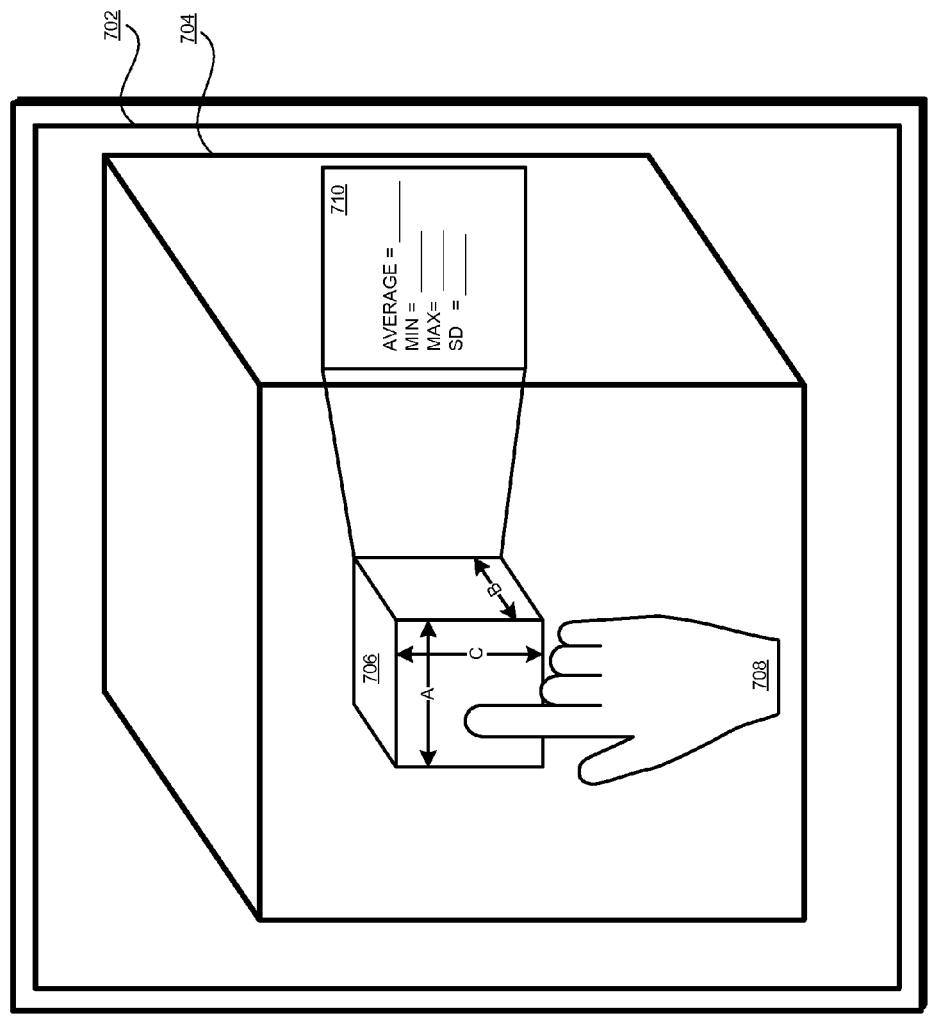

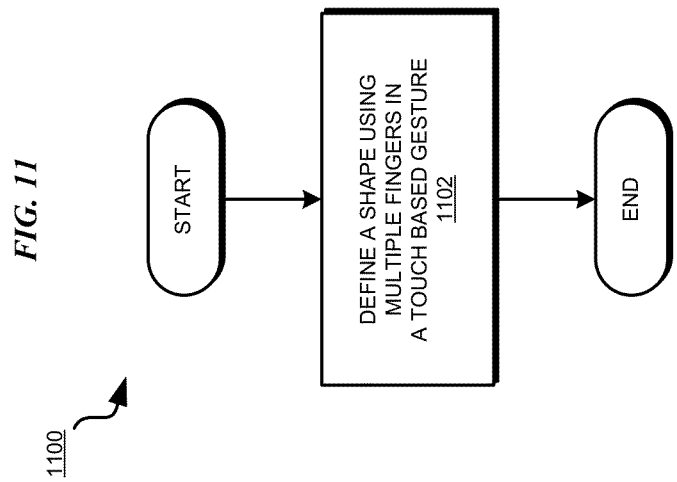

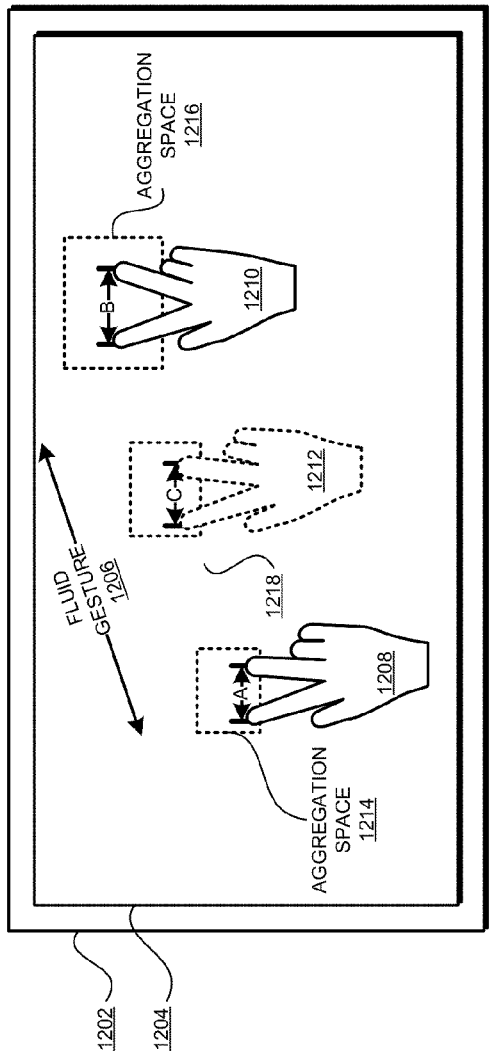
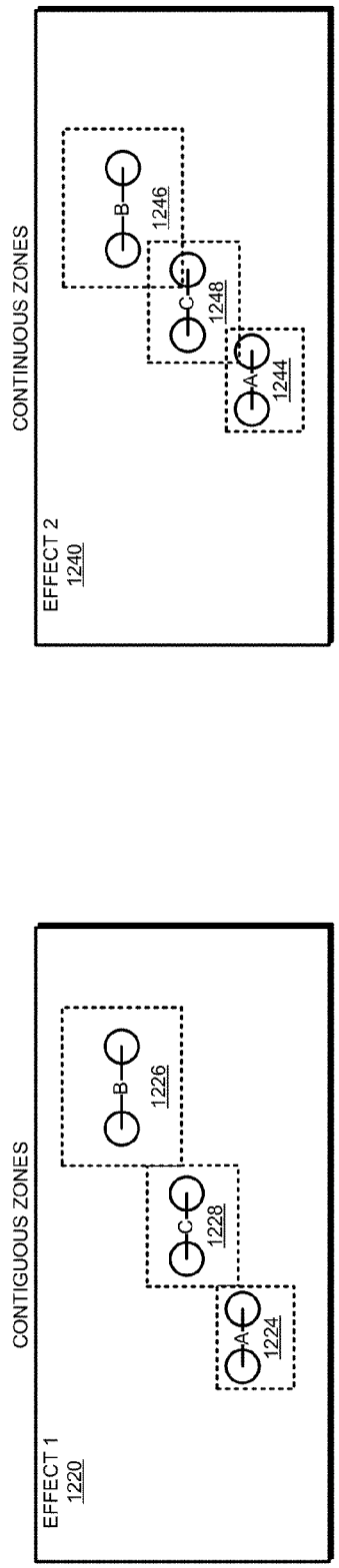
FIG. 12

DATA ANALYSIS USING GESTURES

TECHNICAL FIELD

The present invention relates generally to a computer implemented method, system, and computer program product for presenting data. Particularly, the present invention relates to a computer implemented method, system, and computer program product for data analysis using gestures.

BACKGROUND

Description of the Related Art

Data can be visually presented to a user, such as on a display unit associated with a data processing system. For example, data can be presented in the form of a line graph, area graphs, virtual three-dimensional shape graphs, or a combination thereof. Furthermore, within such graphical representation, the data can be represented using alphanumeric representation, color coded rendering, textured rendering, iconic representation, or other variants of graphical representation of data.

Some applications can present voluminous data in this manner. For example, financial trading information systems can compile and present thousands of data items relating to stock price changes for a portfolio over a period. Temperature records in a region over a period, credit balances information across a bank's users, other information of various kinds stored in databases are some other examples of voluminous data that can be graphically presented in this manner.

Users often have a need for not just a view of the data set, but for some analysis of the data set or a subset of the data set. For example, given data of a stock's price fluctuation over ten years, a user may be interested in only the average price of the stock in the previous year. As another example, given temperature data for a region over the past three decades, a user may be interested in the lowest average weekly recorded temperature in a particular zip code in a particular year.

SUMMARY

The illustrative embodiments provide a method, system, and computer program product for data analysis using gestures. An embodiment defines, using a first gesture on a graphical representation of a data set rendered by an application executing on a data processing system, a first dimension. The embodiment defines, using the first dimension, a shape on the graphical representation of the data set, wherein a grid segments the graphical representation of the data set into a plurality of subsets represented as a plurality of grid blocks, wherein a subset in the plurality of subsets corresponds to a grid block in the plurality of grid blocks, wherein the shape is a visual shape of the grid block, and wherein the shape serves to define the bounds of the corresponding subset. The embodiment makes a second gesture relative to a first target grid block in the plurality of grid blocks. The embodiment performs, responsive to the second gesture, a first data analysis computation on a first target subset corresponding to the first target grid block. The embodiment presents a result of the first data analysis computation using a hardware device.

BRIEF DESCRIPTION OF THE SEVERAL VIEWS OF THE DRAWINGS

The novel features believed characteristic of the embodiments are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3C depicts a block diagram of an example pointing device based gesture to provide one or more dimensions for selecting a data subset from a graphical representation of a data set in accordance with an illustrative embodiment;

FIG. 3D depicts a block diagram of another example pointing device based gesture to provide one or more dimensions for selecting a data subset from a graphical representation of a data set in accordance with an illustrative embodiment;

FIG. 4A depicts a block diagram of an example touch based gesture to provide one or more dimensions for selecting a data subset from a graphical representation of a data set in accordance with an illustrative embodiment;

FIG. 4B depicts a block diagram of another example touch based gesture to provide one or more dimensions for selecting a data subset from a graphical representation of a data set in accordance with an illustrative embodiment;

FIG. 6C depicts a block diagram of an example method of presenting the results of data analysis using gestures in accordance with an illustrative embodiment;

FIG. 7 depicts a block diagram of a process of performing data analysis on data subsets using gestures in accordance with an illustrative embodiment;

FIG. 11 depicts a flowchart of an example process of defining a shape usable in data analysis using gesturing in accordance with an illustrative embodiment; and FIG. 12 depicts a block diagram of an example process of performing data analysis using gesturing in accordance with an illustrative embodiment.

DETAILED DESCRIPTION

Figure 1:
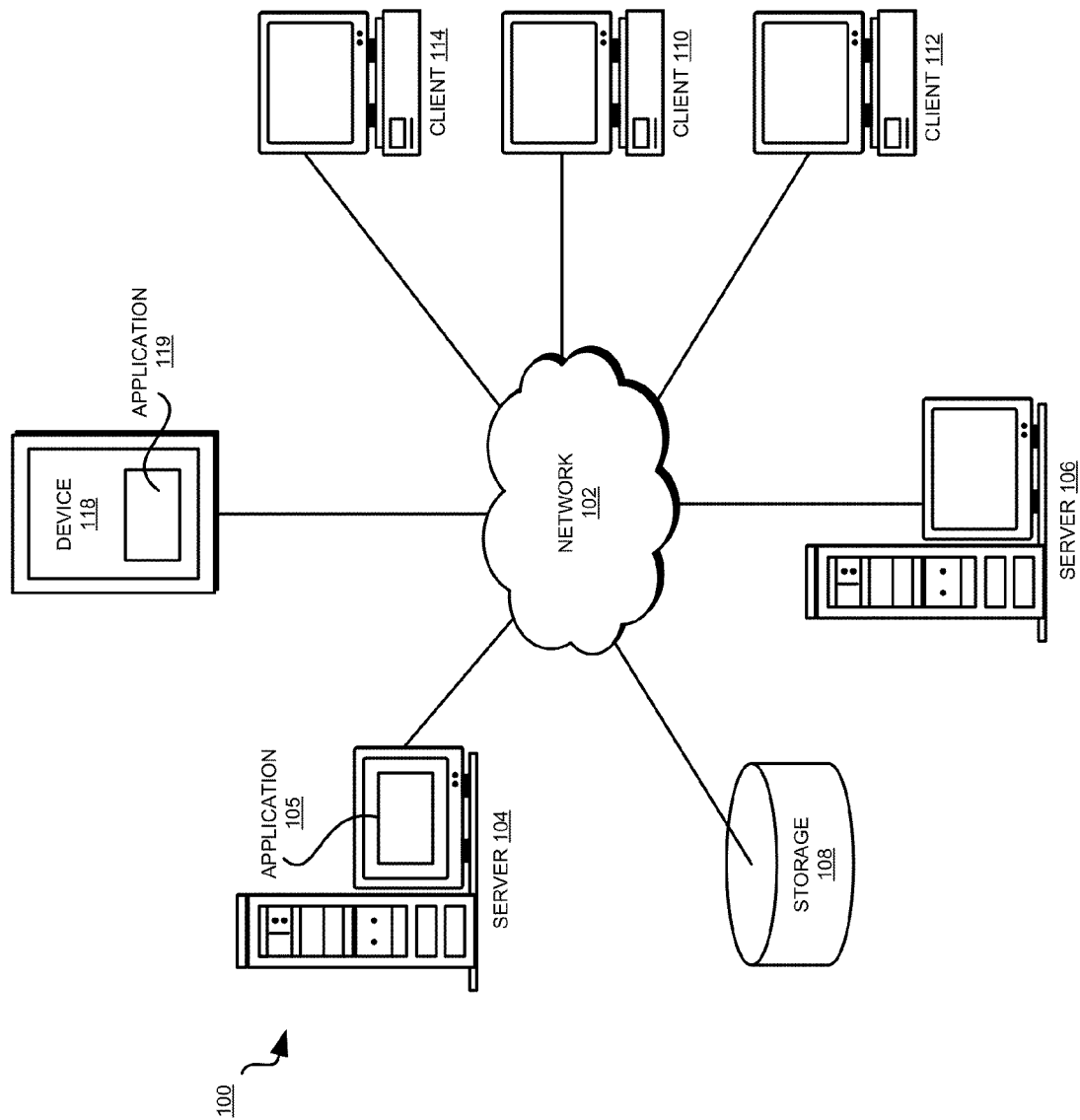
FIG. 1 depicts a pictorial representation of a network of data processing systems in which illustrative embodiments may be implemented.

The illustrative embodiments recognize that identifying a subset of data from a graphically represented data set is a non-trivial problem. Presently, a user has to specify some parameters in a textual form, such as by providing the boundary conditions for the subset as values in input field.

The illustrative embodiments further recognize that even when a subset can be identified graphically, present methods are limited in analyzing only the selected data subset. The illustrative embodiments recognize that users are interested in not just specifying a subset of the data set for analysis, but in analyzing the data set by forming subsets at or near certain points of interest in the data set. Furthermore, the illustrative embodiments recognize that users are interested in specifying how subsets are to be formed at or near the points of interest, rather that specifying criteria for selecting a particular subset.

For example, a user may want to specify that data within a certain boundary from a point of interest should be aggregated and presented. As an example, given a graphical rendering of temperature data for a region for several decades, the user may want to know the average temperatures within thirty days and fifty miles radius from a point in the graphical rendering.

The illustrative embodiments further recognize that the users want to specify the points or areas of interest, and the manner of selecting data subsets at or near those points or areas, by using gestures. Within the scope of the illustrative embodiments, a gesture is an action that a user performs using the user's body, a body part, or an implement, using a virtual representation of the user's body, body part, or an implement, a graphical representation of a movement of a tool or implement.

Presently, data subset select and analysis of the selected subset is an explicit process in which the user has to specify each subset. The presently available methods of data analysis then analyze the data in the specified subset. The illustrative embodiments recognize that specifying data subsets and performing data analysis in this manner is cumbersome, time consuming, and error prone.

The illustrative embodiments used to describe the invention generally address and solve the above-described problems and other problems related to selecting data subsets from a graphical rendering of data and analyzing the data in the subset. The illustrative embodiments provide a method, system, and computer program product for a data analysis using gestures.

Continuing with the temperature data example described above, using an embodiment, a user can indicate a point of interest in the graphical rendering of the temperature data by placing the user's figure at the point. An embodiment can determine a dimension of a line section, an area, or a volume, in the graphical representation, using the user's finger placement.

For example, when, as a gesture, the user places the user's finger at a point on the graphical representation, one embodiment determines the width of the user's finger. The embodiment uses the measured width as a height and width of a grid block. The embodiment then divides the data set in the graphical representation according to a virtual horizontal and vertical grid lines that can be overlaid on the graphical representation to form several grid blocks of the measured height and width.

As another example, as another gesture, a user may place two fingers spread apart on the graphical representation. An embodiment measure the distance between the two fingers' touch points, and use that measurement as the grid dimensions to overlay virtual grid lines.

As another example, as another gesture, a user may place three fingers spread apart on the graphical representation. An embodiment measure the distance between the first and the second finger touch points, and use that measurement as a grid width. The embodiment measure the distance between the second and the third finger touch points, and use that measurement as a grid height. The embodiment then lays the virtual grid lines accordingly to form subsets of the underlying data for analysis.

As another example, as another gesture, a user may use a pointing device, such as a mouse, to make two clicks apart from one another on the graphical representation. An embodiment measure the distance between the first and the second click points, and use that measurement as a grid width. The embodiment then lays the virtual grid lines accordingly to form subsets of the underlying data for analysis.

While some embodiments are described with respect to virtual grid lines, an embodiment does not require the grid lines to either be virtual or be present at all. The grid lines are described merely as one example tool for segmenting data and not and a limitation on the illustrative embodiments. Any other suitable way of segmenting the data using the size specified in the manner of an embodiment is contemplated within the scope of the illustrative embodiments.

An embodiment can use other gestures for determining one or more dimensions. For example, the finger width can provide one dimension and a pressure measurement of the touch can provide another dimension. One or more click-drag-and-release operations of a pointing device can be used in a similar manner to provide one or more dimensions. Sliding a slider display using a pointing device or fingers can also similarly provide one or more dimensions to an embodiment.

Furthermore, an embodiment allows for defining two or more regions in a graphical representation and defining different dimensions for data subsets within the regions. For example, a region of a graphical presentation may correspond to data that is more variable than data in another region. A user can use an embodiment to identify the region of higher variability using a gesture, such as a circle or polygon drawn by finger touch or a pointing device. The user can then gesture using an embodiment to define one or more dimensions for segmenting the data subset within a region into further subsets.

Usually not all data in a given representation requires the same analysis or treatment. Such an embodiment is useful when a user desires varying levels of granularity in the data analysis. The user can specify areas where the user desires coarse analysis of large data subsets, and areas where the user requires fine analysis using smaller data subsets.

Once the dimensions have been specified, the data set has been segmented into line segments, areas, or volumes in the graphical representation, an embodiment can use any analysis methodology for performing the data analysis on a data subset. For example, the user may determine average value in the data subset, mean value of the subset, minima and maxima of the subset, standard deviation (SD) of the subset, or perform any other computation well known in the art of data analysis.

Furthermore, the embodiments can use any suitable manner of outputting the results of the analysis of a data subset. Some example output methods usable by an embodiment include but are not limited to graphical or textual display of the results, audible reading of the results, one or more tonal levels or tonal changes, pitch, or frequencies representing the result, and tactile stimulation corresponding to the results.

The illustrative embodiments are described with respect to certain gestures only as examples. Such descriptions are not intended to be limiting on the illustrative embodiments. For example, an illustrative embodiment described with respect to a touch based gesture can be implemented with respect to a pointing device based gesture within the scope of the illustrative embodiments.

Similarly, the illustrative embodiments are described with respect to certain analyses, values, and data only as examples. Such descriptions are not intended to be limiting on the illustrative embodiments. For example, an illustrative embodiment described with respect to a computation of an average can be implemented to produce another statistical analysis value within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are further described with respect to certain applications only as examples. Such descriptions are not intended to be limiting on the invention. An embodiment of the invention may be implemented with respect to any type of application, such as, for example, applications that are served, the instances of any type of server application, a platform application, a stand-alone application, an administration application, or a combination thereof.

An application, including an application implementing all or part of an embodiment, may further include data objects, code objects, encapsulated instructions, application fragments, services, and other types of resources available in a data processing environment. For example, a Java® object, an Enterprise Java Bean (EJB), a servlet, or an applet may be manifestations of an application with respect to which the invention may be implemented. (Java and all Java-based trademarks and logos are trademarks or registered trademarks of Oracle and/or its affiliates).

An illustrative embodiment may be implemented in hardware, software, or a combination thereof. An illustrative embodiment may further be implemented with respect to any type of data storage resource, such as a physical or virtual data storage device, that may be available in a given data processing system configuration.

The illustrative embodiments are described using specific code, designs, architectures, layouts, schematics, and tools only as examples and are not limiting on the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
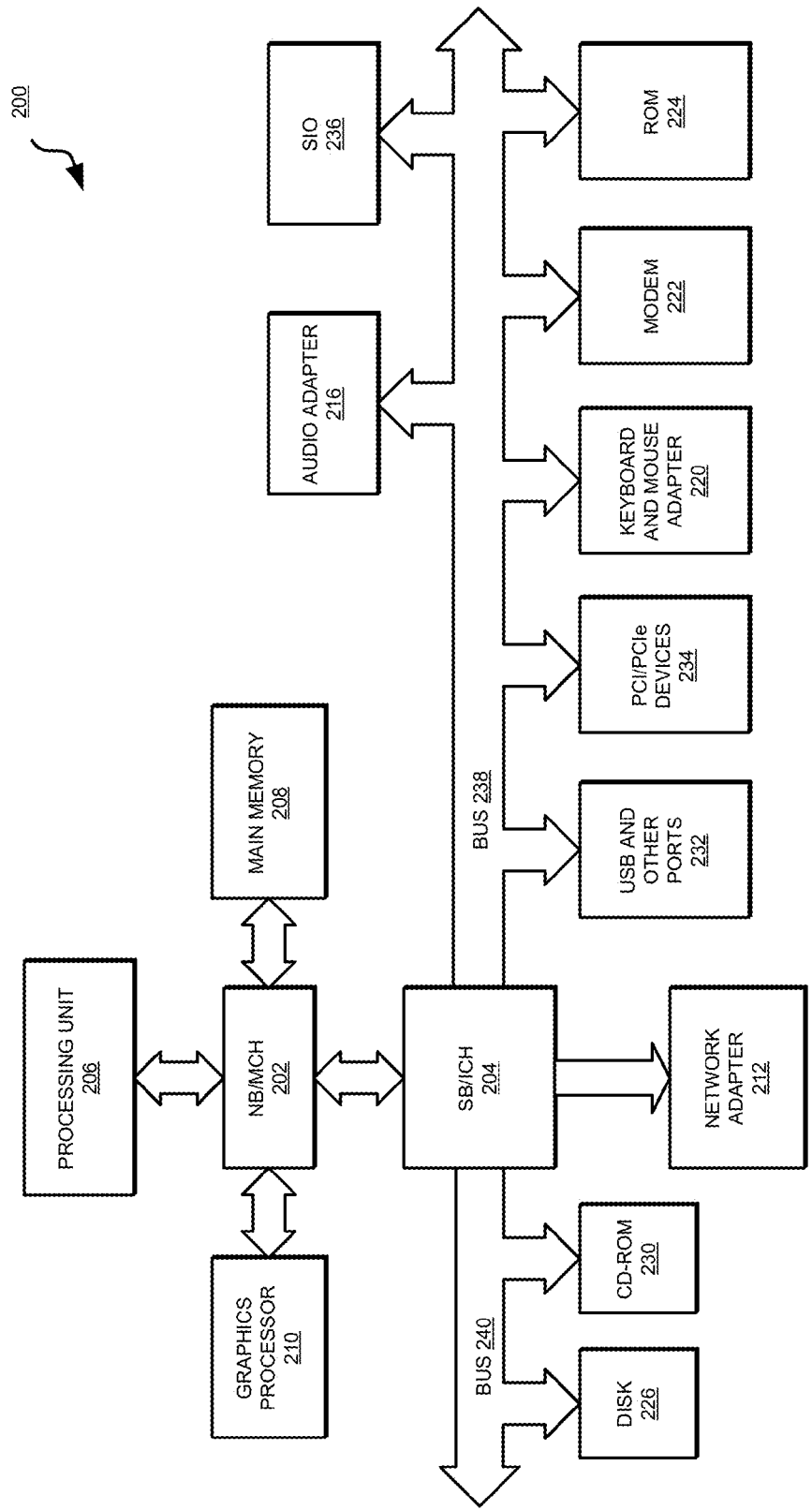
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Device 118 may be any data processing system that includes a touch interface. Some examples of device 118 include, but are not limited to, touch screen displays, smartphones with touch screen, and portable devices with touch screens. Application 119 is an example application implementing one or more embodiments for touch based gestures, pointing device based gestures, or both. Application 105 is another example implementation of one or more embodiments, such as when a touch interface may be unavailable.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes of the illustrative embodiments may be located for the illustrative embodiments.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States, other countries, or both), or Linux® (Linux is a trademark of Linus Torvalds in the United States, other countries, or both). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle and/or its affiliates).

Program instructions for the operating system, the object-oriented programming system, the processes of the illustrative embodiments, and applications or programs are located on storage devices, such as hard disk drive 226, and may be loaded into a memory, such as, for example, main memory 208, read only memory 224, or one or more peripheral devices, for execution by processing unit 206. Program instructions may also be stored permanently in non-volatile memory and either loaded from there or executed in place. For example, the synthesized program according to an embodiment can be stored in non-volatile memory and loaded from there into DRAM.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3B:
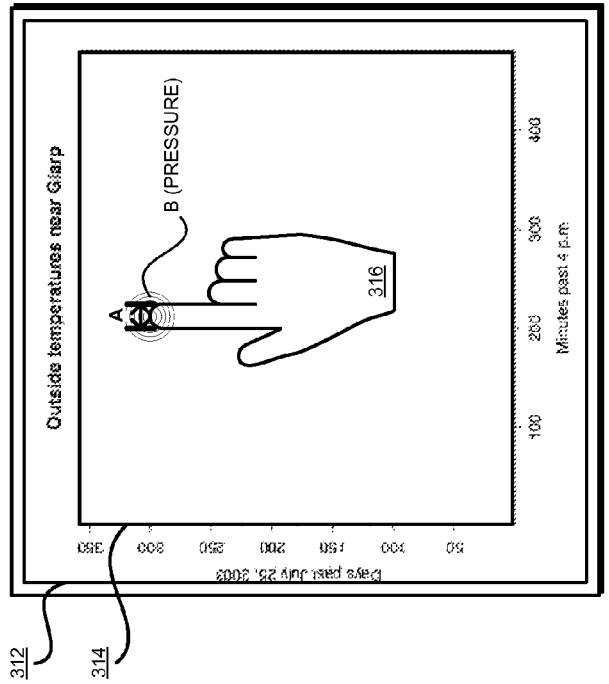
FIG. 3B depicts a block diagram of another example touch based gesture to provide multiple dimensions for selecting a data subset from a graphical representation of a data set in accordance with an illustrative embodiment.
Figure 3A:
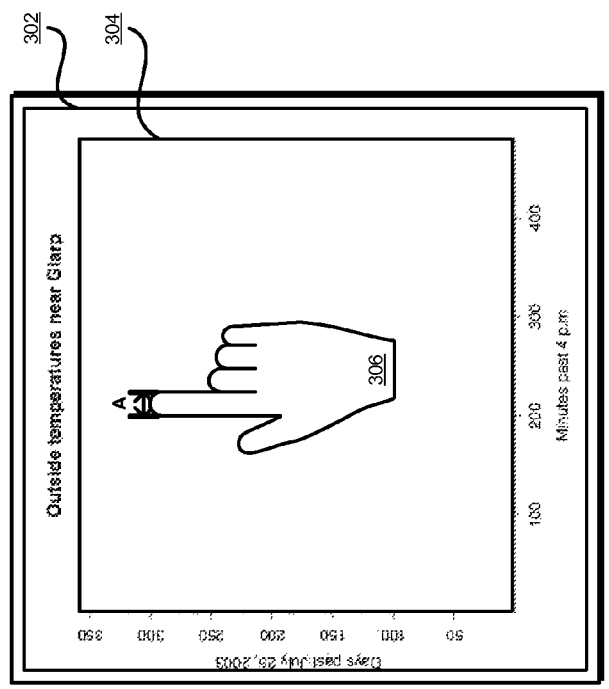
FIG. 3A depicts a block diagram of an example touch based gesture to provide a dimension for selecting a data subset from a graphical representation of a data set in accordance with an illustrative embodiment.

With reference to FIG. 3A, this figure depicts a block diagram of an example touch based gesture to provide a dimension for selecting a data subset from a graphical representation of a data set in accordance with an illustrative embodiment. Interface 302 is a touch interface, such as the touch interface of device 118 in FIG. 1.

Graph 304 is a graphical representation of an example data set that includes temperature data for a period. Hand 306 is a user's hand using which the user places one finger at a point in graph 304 as shown. An embodiment measures width "A" as the width of the touch resulting from placing the finger of hand 306 on graph 304. The embodiment uses measurement "A" as the height and width of a square grid that can be overlaid on graph 304 to divide the underlying data of graph 304 into subsets.

While the grids are described as square or rectangular, such shapes of the grid blocks are not intended to be limiting on the illustrative embodiments. For example, areas in a graphical representation of data can be identified as circles, bubbles, cubes, cuboids, irregular polygons, or any other suitable shape, as described with respect to some embodiments. Those of ordinary skill in the art will be able to adapt other embodiments to use similar shapes instead of square or rectangular grid blocks, and such adaptations are contemplated within the scope of the illustrative embodiments. Furthermore, unless otherwise stated, in this and other figures, each grid block in such a grid constitutes one subset, which can be analyzed, and the result of the analysis outputted, in any suitable manner. A second grid can divide a grid block into further subsets within the scope of the illustrative embodiments.

With reference to FIG. 3B, this figure depicts a block diagram of another example touch based gesture to provide multiple dimensions for selecting a data subset from a graphical representation of a data set in accordance with an illustrative embodiment. Interface 312 is a touch interface, such as the touch interface 302 in FIG. 3A. Graph 314 is similar to graph 304 in FIG. 3A. Hand 316 is analogous to hand 306 in FIG. 3A.

An embodiment measures width "A" as the width of the touch resulting from placing a finger of hand 316 on graph 314. The embodiment uses measurement "A" as one dimension, such as the height, of a grid that can be overlaid on graph 314. The embodiment measures a pressure "B" of the touch and uses the measurement "B" as the other dimension of the grid, such as the width in two-dimensional graph 314 or depth of a cube or cuboid in three-dimensional graph 314.

With reference to FIG. 3C, this figure depicts a block diagram of an example pointing device based gesture to provide one or more dimensions for selecting a data subset from a graphical representation of a data set in accordance with an illustrative embodiment. Interface 322 is a graphical user interface, such as the display of server 104 in FIG. 1, which may or may not include a touch interface. Graph 324 is similar to graph 314 in FIG. 3B. Slider 326 is an example graphical tool for selecting dimension "A".

An embodiment measures width "A" based on the position of slider control 328. An embodiment uses measurement "A" to form a grid that can be overlaid on graph 324. An embodiment can use slider 326 to input multiple dimensions sequentially, or multiple sliders similar to slider 326, to specify other dimensions for some types of data subsets selection.

With reference to FIG. 3D, this figure depicts a block diagram of another example pointing device based gesture to provide one or more dimensions for selecting a data subset from a graphical representation of a data set in accordance with an illustrative embodiment. Interface 332 is a graphical user interface, such as interface 322 in FIG. 3C. Graph 334 is similar to graph 324 in FIG. 3C. Slider 336 and slider control 338 are analogous to slider 326 and slider control 328 respectively in FIG. 3C.

An embodiment measures width "A" based on the position of slider control 338. Display 340 can be a pop-up display presented after slider control 338 is moved, or a display presented when slider 336 is displayed. Display 340 offers a user a choice between two or more ways in which measurement "A" can be used. As an example, in one embodiment, display 340 allows the user to select—checkbox labeled "Square" to indicate that measurement "A" is to be used to form a square grid; checkbox labeled "Circle" to indicate that measurement "A" is to be used to select a circular area of radius "A" around a point of interest in graph 334; checkbox labeled "Grid" to indicate that measurement "A" is to be used as one dimension of a grid, allowing the embodiment to receive a second measurement for another dimension of the grid from the user in any way described in this disclosure; or checkbox labeled "Cube" to indicate that measurement "A" is to be used to form a three-dimensional grid in which the grid blocks are cubes.

Figure 3F:
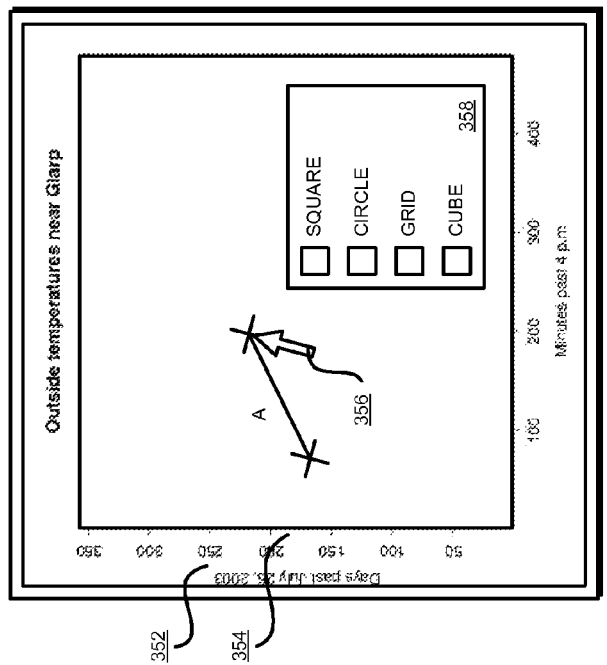
FIG. 3F depicts a block diagram of another example pointing device based gesture to provide one or more dimensions for selecting a data subset from a graphical representation of a data set in accordance with an illustrative embodiment.
Figure 3E:
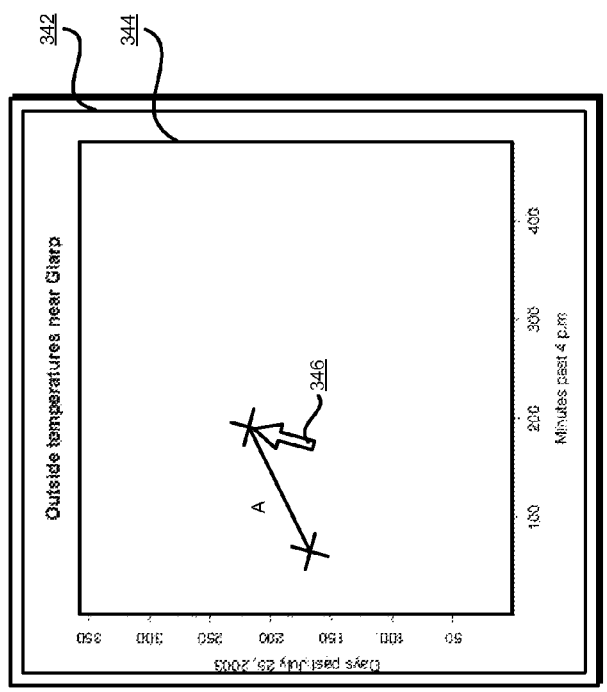
FIG. 3E depicts a block diagram of another example pointing device based gesture to provide one or more dimensions for selecting a data subset from a graphical representation of a data set in accordance with an illustrative embodiment.

With reference to FIG. 3E, this figure depicts a block diagram of another example pointing device based gesture to provide one or more dimensions for selecting a data subset from a graphical representation of a data set in accordance with an illustrative embodiment. Interface 342 is a graphical user interface, such as the display of server 104 in FIG. 1, which may or may not include a touch interface. Graph 344 is similar to graph 334 in FIG. 3D. Pointer 346 is an example graphical tool for selecting dimension "A". As an example, pointer 346 may be the pointer cursor of a mouse pointing device.

An embodiment measures width "A" based on the distance between two points selected on graph 344 using pointer 346. An embodiment uses measurement "A" to form a grid that can be overlaid on graph 344. An embodiment can use pointer 346 to input multiple dimensions sequentially, to specify other dimensions for some types of data subsets selection.

With reference to FIG. 3F, this figure depicts a block diagram of another example pointing device based gesture to provide one or more dimensions for selecting a data subset from a graphical representation of a data set in accordance with an illustrative embodiment. Interface 352 is a graphical user interface, such as interface 342 in FIG. 3E. Graph 354 is similar to graph 344 in FIG. 3E. Pointer 356 is analogous to pointer 346 in FIG. 3E.

An embodiment measures width "A" based on the distance between two points selected on graph 354 using pointer 356. Display 358 can be a pop-up display presented after measurement "A" is taken, or a display presented when pointer 356 selects the first point for measurement "A". In the manner of display 340 in FIG. 3D, display 358 also offers a user a choice between two or more ways in which measurement "A" can be used.

With reference to FIG. 4A, this figure depicts a block diagram of an example touch based gesture to provide one or more dimensions for selecting a data subset from a graphical representation of a data set in accordance with an illustrative embodiment. Interface 402 is a touch interface, such as interface 302 in FIG. 3A. Graph 404 is similar to graph 304 in FIG. 3A. Hand 406 is analogous to hand 306 in FIG. 3A.

Hand 406 is a user's hand using which the user places two fingers apart from one another on graph 404 as shown. An embodiment measures width "A" as the width between the touch points of the two fingers. The embodiment uses measurement "A" as one dimension, such as the height, of a grid that can be overlaid on graph 404.

With reference to FIG. 4B, this figure depicts a block diagram of another example touch based gesture to provide one or more dimensions for selecting a data subset from a graphical representation of a data set in accordance with an illustrative embodiment. Interface 412 is a touch interface, such as interface 402 in FIG. 4A. Graph 414 is similar to graph 404 in FIG. 4A. Hand 416 is analogous to hand 406 in FIG. 4A.

Hand 416 is a user's hand using which the user places three fingers apart from one another on graph 414 as shown. An embodiment measures width "A" as the width between the touch points of the first and the second fingers placed on graph 414. The embodiment uses measurement "A" as one dimension, such as the height, of a grid that can be overlaid on graph 414. The embodiment measures width "B" as the width between the touch points of the second and the third fingers placed on graph 414. The embodiment uses measurement "B" as another dimension, such as the width, of the grid that can be overlaid on graph 414.

Figure 4C:
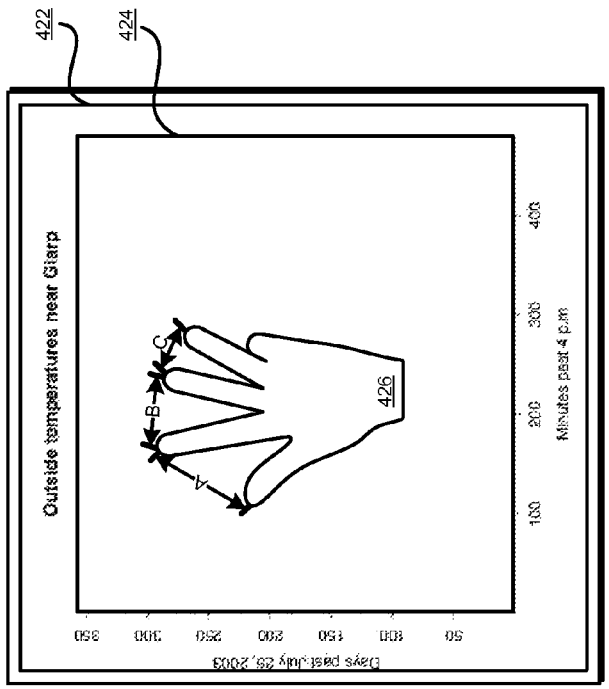
FIG. 4C depicts a block diagram of another example touch based gesture to provide one or more dimensions for selecting a data subset from a graphical representation of a data set in accordance with an illustrative embodiment.

With reference to FIG. 4C, this figure depicts a block diagram of another example touch based gesture to provide one or more dimensions for selecting a data subset from a graphical representation of a data set in accordance with an illustrative embodiment. Interface 422 is a touch interface, such as interface 412 in FIG. 4B. Graph 424 is similar to graph 414 in FIG. 4B. Hand 426 is analogous to hand 416 in FIG. 4B.

Hand 426 is a user's hand using which the user places four fingers apart from one another on graph 424 as shown. An embodiment measures width "A" as the width between the touch points of the first and the second fingers placed on graph 424. The embodiment uses measurement "A" as one dimension, such as the height, of a grid that can be overlaid on graph 424. The embodiment measures width "B" as the width between the touch points of the second and the third fingers placed on graph 424. The embodiment uses measurement "B" as another dimension, such as the width, of the grid that can be overlaid on graph 424. The embodiment measures width "C" as the width between the touch points of the third and the fourth fingers placed on graph 424. The embodiment uses measurement "C" as another dimension, such as the depth, of the grid blocks in a three-dimensional grid that can be overlaid on graph 424.

Figure 4D:
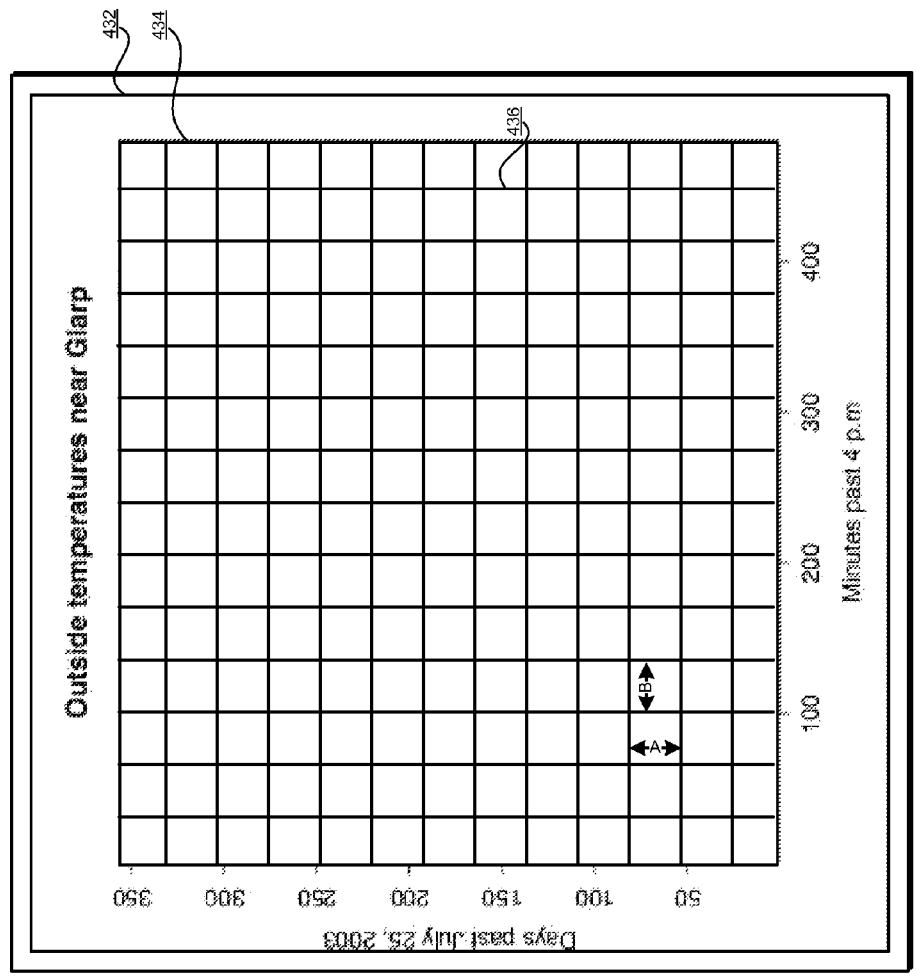
FIG. 4D depicts a block diagram of an example grid overlay resulting from an example touch based gesture for selecting a data subset from a graphical representation of a data set in accordance with an illustrative embodiment.

With reference to FIG. 4D, this figure depicts a block diagram of an example grid overlay resulting from an example touch based gesture for selecting a data subset from a graphical representation of a data set in accordance with an illustrative embodiment. Interface 432 is a touch interface, such as interface 412 in FIG. 4B. Graph 434 is similar to graph 414 in FIG. 4B. Grid 436 uses dimensions "A" and "B" described with respect to FIG. 4B for creating the grid blocks as shown. The user can touch a grid block to perform data analysis on the data segment underlying the touched grid block.

Hand 416 is a user's hand using which the user places three fingers apart from one another on graph 414 as shown. An embodiment measures width "A" as the width between the touch points of the first and the second fingers placed on graph 414. The embodiment uses measurement "A" as one dimension, such as the height, of a grid that can be overlaid on graph 414. The embodiment measures width "B" as the width between the touch points of the second and the third fingers placed on graph 414. The embodiment uses measurement "B" as another dimension, such as the width, of the grid that can be overlaid on graph 414.

Figure 5A:
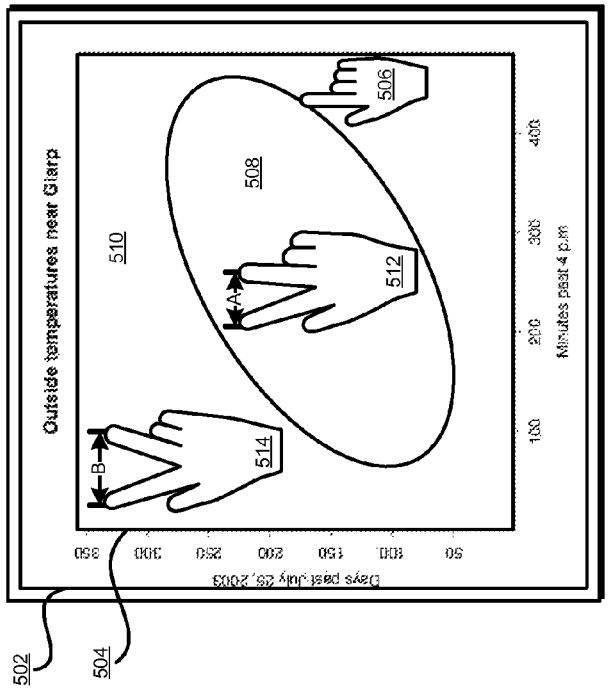
FIG. 5A depicts a block diagram of another example touch based gesture to define regions of different granularity and provide one or more dimensions for selecting a data subset from a graphical representation of a data set in accordance with an illustrative embodiment.

With reference to FIG. 5A, this figure depicts a block diagram of another example touch based gesture to define regions of different granularity and provide one or more dimensions for selecting a data subset from a graphical representation of a data set in accordance with an illustrative embodiment. Interface 502 is a touch interface, such as interface 422 in FIG. 4C. Graph 504 is similar to graph 424 in FIG. 4C. Hand 506 is analogous to hand 426 in FIG. 4C. Hand positions 512 and 514 are subsequent placement of hand 506 for additional gestures as described herein.

Hand 506 is a user's hand using which the user gestures to draw region 508, depicted as an ellipse as an example. Region 508 is a region in graph 504 where the user requires smaller granularity in defining the data subsets for analysis. Drawing region 508 results in region 510, which can use a different granularity for the subsets.

Upon defining region 508, the user repositions hand 506 within region 508, such as at hand position 512. The user places two fingers apart from one another on region 508 at hand position 512 as shown. An embodiment measures width "A" as the width between the touch points of the two fingers placed on region 508. The embodiment uses measurement "A" as a dimension for a grid to be used within region 508. Additional dimensions can be specified (not shown) for the grid for region 508 using an embodiment described herein.

The user repositions hand 506 within region 510, such as at hand position 514. The user places two fingers apart from one another on region 510 at hand position 514 as shown. An embodiment measures width "B" as the width between the touch points of the two fingers placed on region 510. The embodiment uses measurement "B" as a dimension for a grid to be used within region 510. Additional dimensions can be specified (not shown) for the grid for region 510 using an embodiment described herein.

Figure 5B:
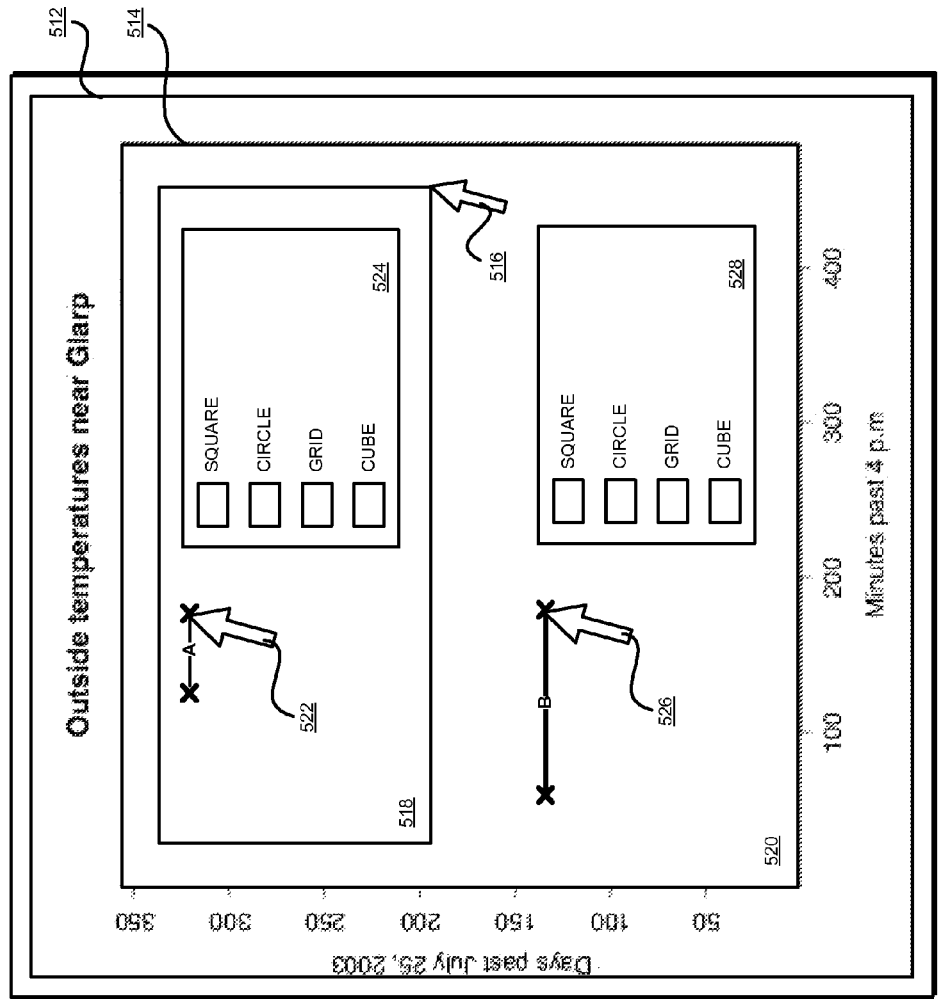
FIG. 5B depicts a block diagram of another example pointing device based gesture to define regions of different granularity and provide one or more dimensions for selecting a data subset from a graphical representation of a data set in accordance with an illustrative embodiment.

With reference to FIG. 5B, this figure depicts a block diagram of another example pointing device based gesture to define regions of different granularity and provide one or more dimensions for selecting a data subset from a graphical representation of a data set in accordance with an illustrative embodiment. Interface 512 is a graphical user interface, such as interface 342 in FIG. 3E. Graph 514 is similar to graph 504 in FIG. 5A. Pointer 516 is analogous to pointer 346 in FIG. 3E.

Pointer 516 is used to gesture and draw region 518, depicted as a rectangle as an example. Region 518 is a region in graph 514 where the user requires smaller granularity in defining the data subsets for analysis. Drawing region 518 results in region 520, which can use a different granularity for the subsets.

Upon defining region 518, the user repositions pointer 516 within region 518, such as by selecting two points within region 518 as shown, and resting pointer 516 at position 522. An embodiment measures width "A" as the width between the selected points in region 518. The embodiment uses measurement "A" as a dimension for a grid to be used within region 518.

Display 524 can be a pop-up display presented after measurement "A" is taken, or a display presented when pointer 516 selects the first point for measurement "A". In the manner of display 358 in FIG. 3F, display 524 also offers a user a choice between two or more ways in which measurement "A" can be used. Additional dimensions can be specified (not shown) for the grid for region 518 using an embodiment described herein.

The user repositions pointer 516 within region 520, such as by selecting two points within region 520 as shown, and resting pointer 516 at position 526. An embodiment measures width "B" as the width between the selected points in region 520. The embodiment uses measurement "B" as a dimension for a grid to be used within region 520.

Display 528 can be a pop-up display presented after measurement "B" is taken, or a display presented when pointer 516 selects the first point for measurement "B". In the manner of display 524, display 528 also offers a user a choice between two or more ways in which measurement "B" can be used. Additional dimensions can be specified (not shown) for the grid for region 520 using an embodiment described herein.

Figure 5C:
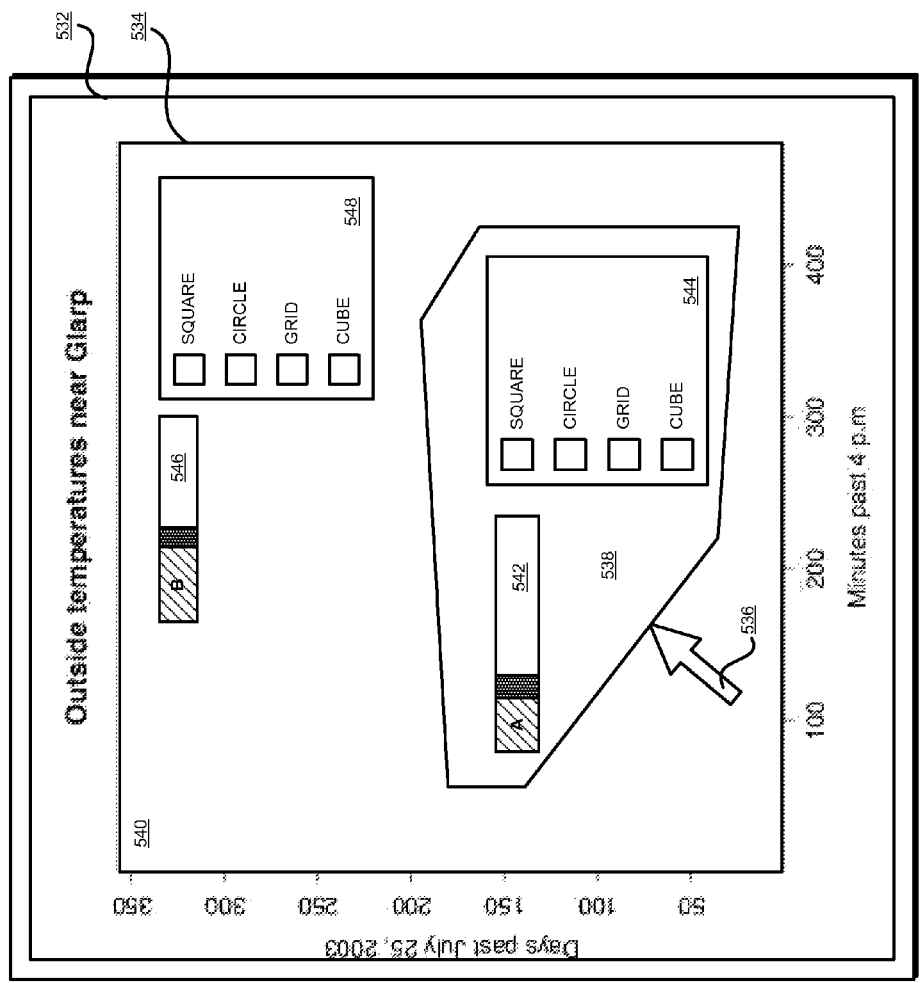
FIG. 5C depicts a block diagram of another example pointing device based gesture to define regions of different granularity and provide one or more dimensions for selecting a data subset from a graphical representation of a data set in accordance with an illustrative embodiment.

With reference to FIG. 5C, this figure depicts a block diagram of another example pointing device based gesture to define regions of different granularity and provide one or more dimensions for selecting a data subset from a graphical representation of a data set in accordance with an illustrative embodiment. While certain embodiments are described using a pointing device, such as a mouse, the embodiment can similarly be used with other interfaces available on a computer, for example, using the buttons or scrolling interface for audio volume control, for changing a dimension within the scope of the illustrative embodiments. Interface 532 is a graphical user interface, such as interface 332 in FIG. 3D. Graph 534 is similar to graph 514 in FIG. 5B. Pointer 536 is similar to pointer 516 in FIG. 5B. Sliders 542 and 544 are analogous to slider 336 in FIG. 3D.

Furthermore, generally and for all embodiments unless otherwise specifically stated, artifacts of an embodiment, such as sliders 542 and 546, and the grid settings displays, such as displays 544 and 548, can be placed anywhere in a graphical user interface, and not necessarily on graph 534 as shown. For example, an implementation can place sliders 542 and 546, displays 544 and 548, or a combination thereof adjacent to graph 534, or elsewhere on interface 532 without departing the scope of the illustrative embodiments. Finger placement and pointer placement can also similarly occur elsewhere on corresponding interfaces within the scope of the illustrative embodiments.

Only as an example and without implying a limitation to this method of defining a region on graph 534, pointer 536 is used to gesture and draw region 538, depicted as a polygon as an example. Region 538 is a region in graph 534 where the user requires smaller granularity in defining the data subsets for analysis. Drawing region 538 results in region 540, which can use a different granularity for the subsets.

Placing or clicking pointer 536 within region 538 causes slider 542, display 544, or both, to be presented to the user. An embodiment measures width "A" using slider 542 as described earlier. Display 544 is analogous to display 340 in FIG. 3D or display 524 in FIG. 5B, and operates in a similar manner to offer choices to the user with respect to measurement "A".

Placing or clicking pointer 536 within region 540 causes slider 546, display 548, or both, to be presented to the user. An embodiment measures width "B" using slider 546 as described earlier. Display 548 is analogous to display 544, and operates in a similar manner to offer choices to the user with respect to measurement "B".

Figure 6A:
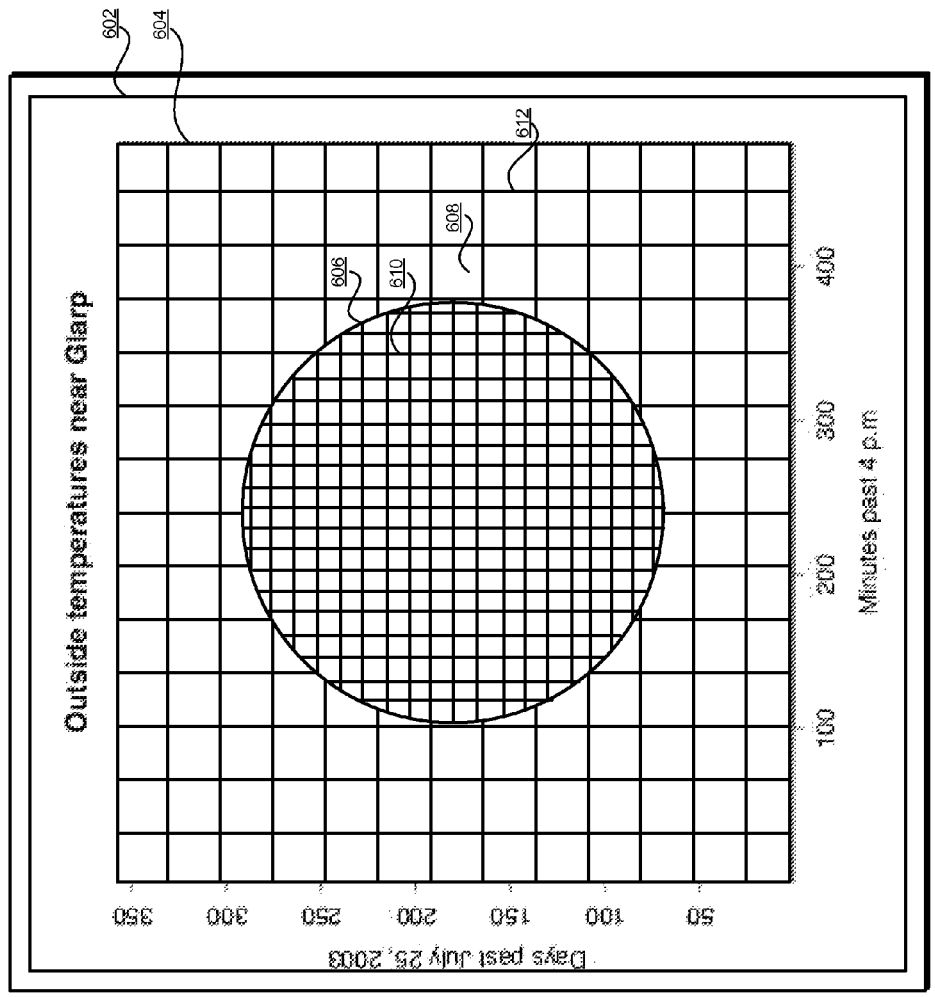
FIG. 6A depicts a block diagram of the grid overlays formed using regions defined and one or more dimensions provided for selecting a data subset from a graphical representation of a data set in accordance with an illustrative embodiment.

With reference to FIG. 6A, this figure depicts a block diagram of the grid overlays formed using regions defined and one or more dimensions provided for selecting a data subset from a graphical representation of a data set in accordance with an illustrative embodiment. Interface 602 may be a graphical user interface, such as interface 532 in FIG. 5C, or a touch interface, such as interface 502 in FIG. 5A. Graph 604 is similar to graph 534 in FIG. 5C.

Region 606, depicted as a circular region according to an embodiment, is a region in graph 604 defined for smaller granularity of the data subsets for analysis. Region 608 has been defined for a different granularity for the data subsets therein. Grid 610 in region 606 is formed using measurement "A" of an embodiment, and includes grid blocks that are smaller than the grid blocks of grid 612 in region 608, which is formed using measurement "B" of an embodiment.

Figure 6B:
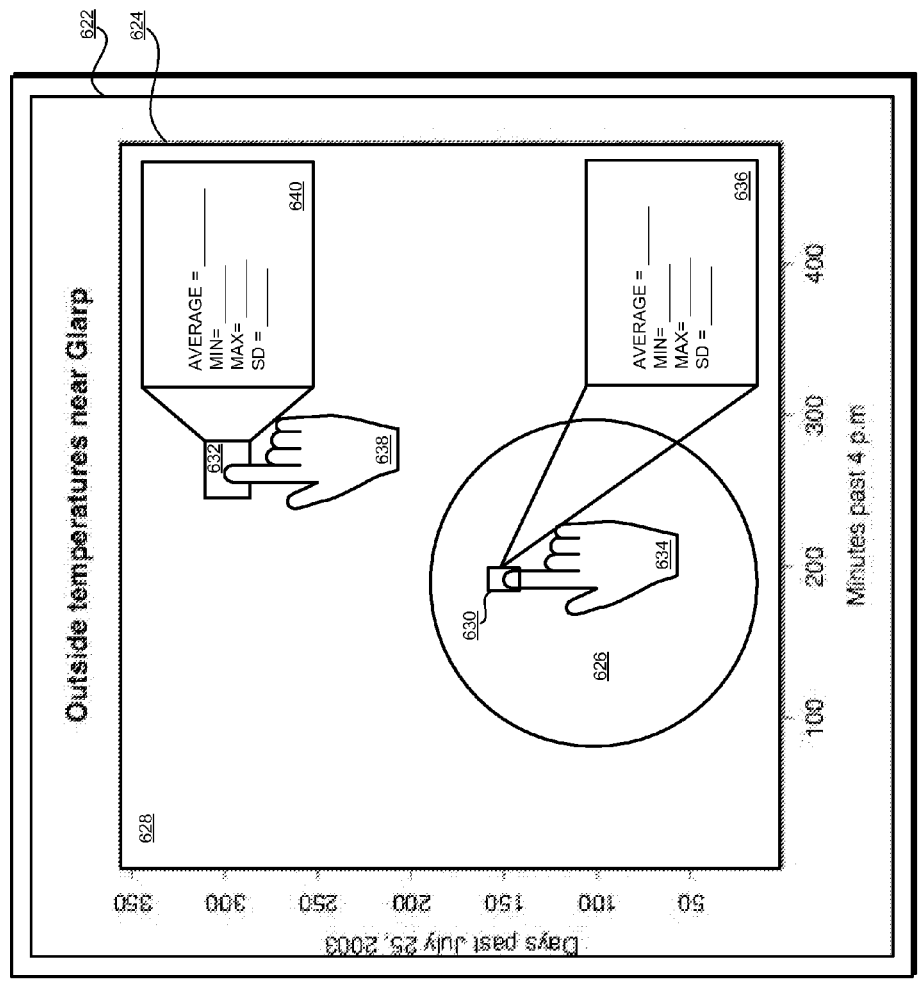
FIG. 6B depicts a block diagram of a process of performing data analysis on data subsets using gestures in accordance with an illustrative embodiment.

With reference to FIG. 6B, this figure depicts a block diagram of a process of performing data analysis on data subsets using gestures in accordance with an illustrative embodiment. Interface 622 is analogous to interface 602 in FIG. 6A. Graph 624 is analogous to graph 604 in FIG. 6A. Region 626 is analogous to region 606 in FIG. 6A. Region 628 is analogous to region 608 in FIG. 6A.

Grid block 630 is an example grid block from fine granularity grid 610 in region 606 in FIG. 6A. Grid block 632 is an example grid block from coarse granularity grid 612 in region 608 in FIG. 6A.

Hand 634 is a user's hand using which the user gestures to perform data analysis. Placing a finger of hand 634 in region 626, such as over grid block 630 causes the subset of the data set that underlies grid block 630 to be analyzed in a desired manner. For example, display 636 may display a result of the analysis of the subset, such as an average value in the subset, a minima or a maxima of the subset, or a standard deviation of the subset, or another analytical result. Display 636 may be a pop-up graphical or textual display, a side-panel graphical or textual display, output to a file, print out, audio read-out, tonal output such as a Geiger counter or a tone of varying pitch or frequency, tactile output such as change of temperature or texture of a surface, or any other suitable form of presenting the results.

Similarly, gesturing by placing a finger of hand 634 at position 638 in region 628, such as over grid block 632 causes the subset of the data set that underlies grid block 632 to be analyzed in a desired manner. For example, display 640 may display a result of the analysis of the subset underlying grid block 632. Display 640 may display similar or different results, in a similar or different manner, as display 636. An embodiment allows hand 634 to slide contiguously across data segments, without lifting, to the position of hand 638. During such sliding motion, the contents of display 640 change when the touch point changes from one segment to another.

With reference to FIG. 6C, this figure depicts a block diagram of an example method of presenting the results of data analysis using gestures in accordance with an illustrative embodiment. Artifacts 652, 654, 656, 658, 660, 662, 664, and 666 correspond to artifacts 622, 624, 626, 628, 630, 632, 634, and 638 in FIG. 6B.

Output device 668 is an example audio output device, such as a speaker. When the user gestures using the user's hand in position 664 over grid block 660, output device 668 outputs results 670 in audio form. For such gesturing, result 670 corresponds to the data analysis results of the data subset underlying grid block 660. When the user gestures using the user's hand in position 666 over grid block 662, output device 668 outputs results 670 in audio form. For such gesturing, result 670 corresponds to the data analysis results of the data subset underlying grid block 662. As described with respect to FIG. 6B, an embodiment allows a user's hand to slide contiguously across data segments, without lifting. During such sliding motion, the output from output device 668 can also change continuously when the touch point changes from one segment to another.

With reference to FIG. 7, this figure depicts a block diagram of a process of performing data analysis on data subsets using gestures in accordance with an illustrative embodiment. Interface 702 is analogous to interface 602 in FIG. 6A. Graph 704 is a three-dimensional representation of a data set, which can be segmented in a manner analogous to the segmenting of data set of graph 604 in FIG. 6A.

Grid block 706 is a three-dimensional grid block whose underlying data subset can be analyzed using gestures according to an embodiment. For example, the user may provide dimensions "A", "B", and "C" to form grid block 706 according to an embodiment described herein.

Hand 708 is a user's hand using which the user gestures to perform data analysis. Placing a finger of hand 708 over grid block 706 causes the subset of the data set that underlies grid block 706 to be analyzed in a desired manner. Result 710 may include results of any suitable data analysis, and may be output in any manner suitable, such as described with respect to displays 622 and 624 in FIG. 6B. Furthermore, the position may advance in the "B" direction through any suitable method, including, a depth slider, pressure from the finger, or detection of motion in a three-dimensional motion sensing environment, such as in a gaming console based interface that senses a user's movements in a 3D space and performs corresponding actions in a virtual 3D space rendering.

Figure 8B:
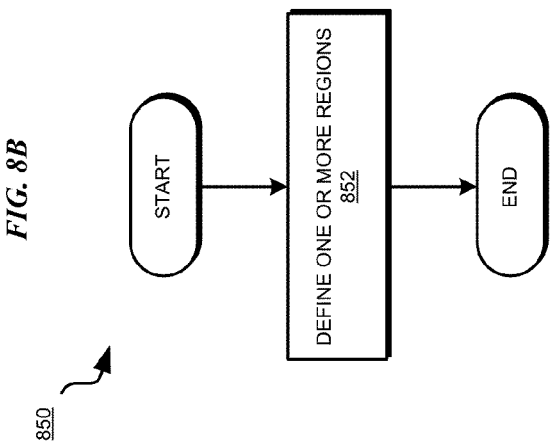
FIG. 8B depicts a flowchart of a process for defining regions of differing granularity for data analysis using gestures in accordance with an illustrative embodiment.
Figure 8A:
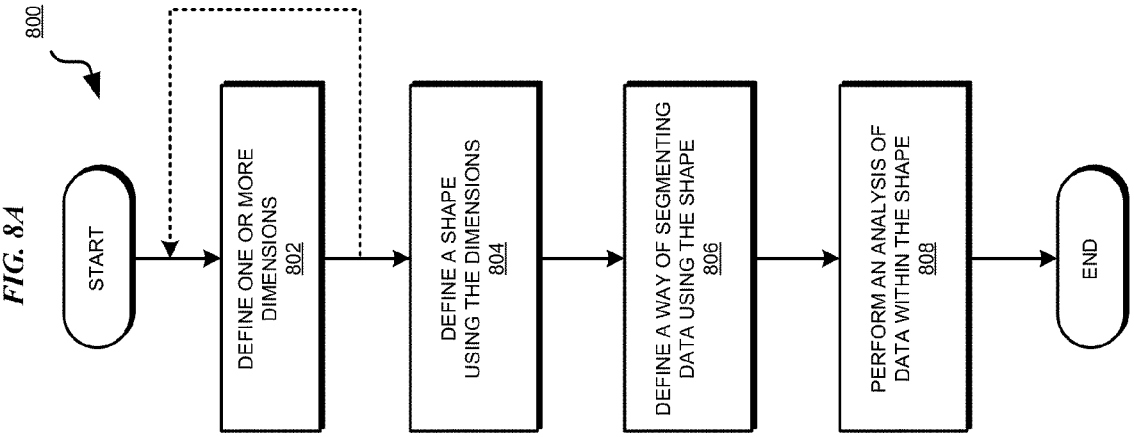
FIG. 8A depicts a flowchart of a process of performing data analysis using gestures in accordance with an illustrative embodiment.

With reference to FIG. 8A, this figure depicts a flowchart of a process of performing data analysis using gestures in accordance with an illustrative embodiment. Process 800 can be implemented in an application, such as application 105 or application 119 in FIG. 1.

Process 800 begins by defining one or more dimensions for selecting subsets of a given data set on a graphical representation of the data set (step 802). When more than one dimensions are being defined, process 800 repeats step 802 until all dimensions have been specified. The dimensions being specified in step 802 may be, for example, dimensions "A", "B", "C", or a combination thereof, as described with respect to any of FIGS. 3A, 3B, 3C, 3D, 3E, 3F, 4A, 4B, 4C, 5A, 5B, 5C, and 7, or a combination thereof.

Process 800 defines a shape using the defined dimension(s) of step 802 (step 804). Process 800 defines a way of segmenting the data set using the shape (step 806). For example, in one embodiment, the shape defined in step 804 may be a shape of a grid block in a grid resulting from the dimensions of step 802. In one embodiment, the grid may not only be formed using linear lines, but also using curves, such as intersecting circles or intersecting bubbles, or curves fitted to polynomial equations. Furthermore, while only two and three dimensional grids have been described with respect to certain embodiments, the illustrative embodiments are similarly applicable for multi-dimensional data, and an embodiment can be adapted to form grids and grid blocks in n-dimensions using this disclosure. Such adaptations of an embodiment to n-dimensional data space are contemplated within the scope of the illustrative embodiments.

Process 800 performs an analysis of the data subset with an instance of the shape, such as within one of the several grid blocks formed as a result of steps 802 and 804 (step 808). Process 800 ends thereafter. Any suitable data analysis technique may be implemented in step 806 without limitation.

With reference to FIG. 8B, this figure depicts a flowchart of a process for defining regions of differing granularity for data analysis using gestures in accordance with an illustrative embodiment. Process 850 can be implemented in a manner similar to process 800 in FIG. 8A.

Process 850 begins by defining one or more regions in a graphical representation of a data set (step 852). Process 850 may ends thereafter. Some examples of executing step 852 are depicted and described with respect to FIGS. 5A, 5B, and 5C.

In one embodiment (not shown), after a region is defined in step 852, process 850 executes process 800 for that region. In another embodiment (not shown), process 850 defines multiple regions in step 852, ends thereafter, and process 800 is executed relative to each region thus defined. Several examples using the regions defined in step 852 are described with respect to FIGS. 8A, 6A, 6B, and 6C.

Figure 9:
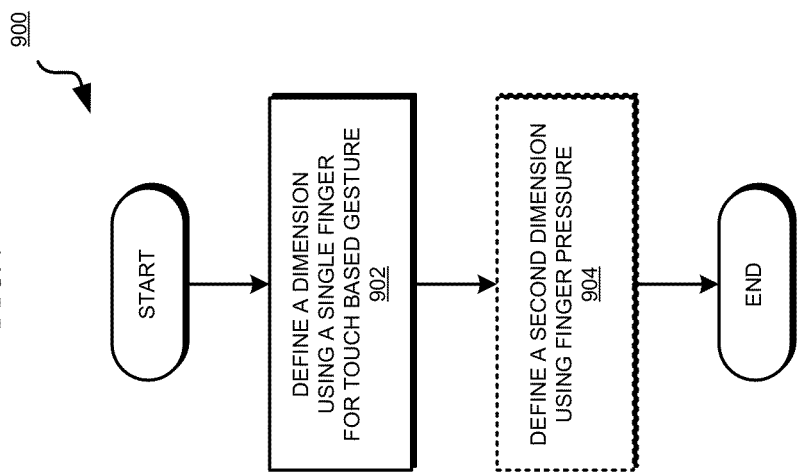
FIG. 9 depicts a flowchart of a process of defining a dimension usable in data analysis using gesturing in accordance with an illustrative embodiment.

With reference to FIG. 9, this figure depicts a flowchart of a process of defining a dimension usable in data analysis using gesturing in accordance with an illustrative embodiment. Process 900 can be implemented as step 802 in process 800 in FIG. 8A.

Process 900 begins by defining a dimension using a single finger for a touch based gesture (step 902). An example of such a method of defining a dimension is described with respect to FIG. 3A.

Optionally, process 900 may define a second dimension using a pressure measurement from the finger during the touch based gesture of step 902 (step 904). Process 900 ends thereafter.

Figure 10:
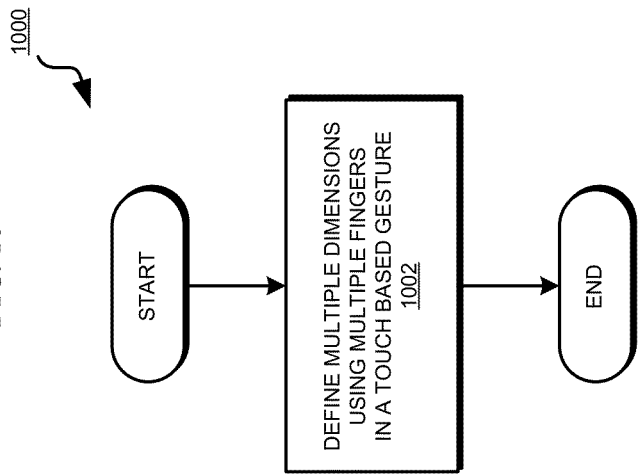
FIG. 10 depicts a flowchart of an example process of defining dimensions usable in data analysis using gesturing in accordance with an illustrative embodiment.

With reference to FIG. 10, this figure depicts a flowchart of an example process of defining dimensions usable in data analysis using gesturing in accordance with an illustrative embodiment. Process 1000 can be implemented as step 802 in process 800 in FIG. 8A.

Process 1000 begins by defining several dimensions using multiple fingers for a touch based gesture (step 1002). Some examples of such a method of defining a dimension are described with respect to FIGS. 4A, 4B, and 4C. Process 1000 ends thereafter.

With reference to FIG. 11, this figure depicts a flowchart of an example process of defining a shape usable in data analysis using gesturing in accordance with an illustrative embodiment. Process 1100 can be implemented as step 804 in process 800 in FIG. 8A.

Process 1100 begins by defining a shape using multiple fingers for a touch based gesture (step 1102). Some examples of such a method of defining a dimension are described with respect to FIGS. 4A, 4B, and 4C. Process 1100 ends thereafter.

With reference to FIG. 12, this figure depicts a block diagram of an example process of performing data analysis using gesturing in accordance with an illustrative embodiment. Interface 1202 is analogous to interface 602 in FIG. 6A. Graph 1204 is analogous to graph 604 in FIG. 6A. In one embodiment, process 800 in FIG. 8A is carried out as a result of gesture 1206.

While the gestures in certain embodiments are described as discrete gestures, to wit, a gesture made in at a discrete time instance, and stopped and held in place for recognition within the discrete time period, the illustrative embodiments are not intended to be limited to discrete gestures. The illustrative embodiments are adaptable to fluid gestures as well. A fluid gesture is a gesture that changes in continuous time, and the gesture, including the changes in the gesture, is recognized in continuous time. Recognition of a fluid gesture is then used to adjust a segmentation of the data set, an analysis of a subset of the data set, or both.

Gesture 1206 is an example fluid gesture. An embodiment recognizes that gesture 1206 begins at hand position 1208 at time T1, with fingers spaced at distance "A", and ends at hand position 1210 at time T2 with fingers spaced at distance "B". The transition in gesture 1206 from hand position 1208 to hand position 1210 includes transitioning through hand position 1212 at time T3, perhaps with the fingers spaced at an intermediate distance between "A" and "B" at hand position 1212, such as distance "C".

The spacing of the fingers is used to define or change a grid that segments the data set underlying graph 1204. In one embodiment, assuming square grid blocks, distances "A", "C", and "B" are used to modify the grid block shape or size while fluid gesture 1206 is occurring in continuous time relative to interface 1202.

For example, at the beginning of gesture 1206, the size of aggregation space 1214 corresponds to a factor of distance "A". In other words, a subset of the data set of graph 1204 that underlies aggregation space 1214 is selected for analysis at the beginning of gesture 1206. At the end of gesture 1206, the size of aggregation space 1216 corresponds to a factor of distance "B". In other words, a subset of the data set of graph 1204 that underlies aggregation space 1216 is selected for analysis at the end of gesture 1206. While changing from aggregation space 1214 to 1216, intermediate aggregation space 1218 has dimensions that correspond to distance "C" at the time of intermediate hand position 1212. A subset of the data set of graph 1204 that underlies aggregation space 1218 can be selected for analysis at the time gesture 1206 transitions through hand position 1212.

In one embodiment, effect 1220 depicts an effect of gesture 1206 on data subset selection for analysis during a continuous period of gesture 1206. Effect 1220 depicts aggregation spaces 1224, 1228, and 1226, corresponding to aggregation spaces 1214, 1218, and 1216 respectively, and changing dimensions according to finger spacing distances "A", "C", and "B" respectively. Effect 1220 also shows the positioning of aggregation spaces 1224, 1228, and 1226 as being contiguous with each other. In other words, during fluid gesture 1206, an aggregation space corresponding to a changed finger spacing distance is formed adjacent to and contiguous with the boundary of the aggregation space formed using a previous finger spacing distance. In such an embodiment, aggregation spaces 1224, 1228, and 1226 are non-overlapping.

In another embodiment, effect 1240 depicts an effect of gesture 1206 over a continuous period. Effect 1240 depicts aggregation spaces 1244, 1248, and 1246, corresponding to aggregation spaces 1214, 1218, and 1216 respectively, and changing dimensions according to finger spacing distances "A", "C", and "B" respectively. Effect 1240 also shows the positioning of aggregation spaces 1244, 1248, and 1246 as being continuous. In other words, during fluid gesture 1206, an aggregation space corresponding to a changed finger spacing distance at any given time is formed at the corresponding hand position at that time without regard to the boundary of an aggregation space formed using a previous finger spacing distance. In such an embodiment, aggregation spaces 1244, 1248, and 1246 can be overlapping as shown.

Regardless of whether the aggregation spaces are contiguous or continuous according to effects 1220 or 1240, the data analysis is performed on an aggregation space that is defined and is effective at a given time during fluid gesture 1206. For example, according to effect 1220, at time T1 at hand position 1208, aggregation space 1224 is effective for data analysis. In effect 1220, at time T3 at hand position 1212, if hand position 1212 overlies aggregation space 1224, then aggregation space 1224 remains effective for data analysis until such time as the hand position has transitioned outside the boundary of aggregation space 1224, and aggregation space 1228 becomes effective for data analysis according to distance "C".

As another example, according to effect 1240, at time T1 at hand position 1208, aggregation space 1244 is effective for data analysis. In effect 1240, at time T3 at hand position 1212, even if hand position 1212 overlies aggregation space 1244, new aggregation space 1228 becomes effective for data analysis according to distance "C".

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for data analysis using gestures. Using an embodiment of the invention, a user can visually segment a data set into several subsets using touch based or pointer based gestures. The user can also segment different regions of the data set differently using touch based or pointer based gestures.

The user can further use touch based or pointer based gestures to perform data analysis on the segments, which comprise subsets of the data set. As the user gestures away from one segment to another segment, a data analysis associated with the other segment is performed. The result of the data analysis can be output in any manner suitable for a given implementation.

The shapes defined for segmenting a data set need not be defined prior to data analysis and fixed for the duration of the data analysis. Data set segmentation shapes, such as the shapes defined in FIGS. 3B, 4A, 4B, and 4C, can be defined and changed dynamically, to with, during data analysis, within the scope of the illustrative embodiments. For example a segment shape can be defined and changed simultaneously with a user sliding the hand and varying the distance between the fingers.

While the embodiments are described using a grid that includes several grid bocks, dividing the entire data set into those grid blocks is not necessitated by the illustrative embodiments. For example, an embodiment can be adapted such that the entire grid and several grid blocks are not defined, but only one grid block according to the specified dimensions and at the location of the gesture is defined for data analysis.

Furthermore, a user need not specify all dimensions or parameters of data segmentation. For example, the illustrative embodiments contemplate suggesting an automatic segmentation based on certain characteristics of the data set being analyzed. For example, the data analysis may present a suggested grid of suggested grid block dimensions, which can be accepted or changed by the user. Furthermore, the illustrative embodiments contemplate a user accepting the suggested segmentation for one region of the data, and specifying the segmentation dimensions for another region of the data as described in this disclosure.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device. The terms "computer usable storage device" "storage device" do not encompass a signal propagation medium, any description in this disclosure to the contrary notwithstanding.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like, conventional procedural programming languages, such as the "C" programming language or similar programming languages, and mainframe programming languages such as REXX, Assembly, and Cobol. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for data analysis using gestures, the method comprising:

determining, using a first gesture on a graphical representation of a data set rendered by an application executing on a data processing system, a first dimension;

defining, using the first dimension, a shape on the graphical representation of the data set;

segmenting, using a grid, the graphical representation of the data set into a plurality of subsets;

representing each subset in the plurality of subsets as a grid block in a plurality of grid blocks, wherein a particular subset in the plurality of subsets corresponds to a particular grid block in the plurality of grid blocks;

representing a visual shape of each grid block in the plurality of grid blocks in the form of said shape, said shape defining bounds of the corresponding subset of the data set, wherein said shape is configured to receive a gesture input and perform an analytical operation on data within the bounds of the subset;

making a second gesture relative to a first target grid block in the plurality of grid blocks;

performing, responsive to the second gesture, a first data analysis computation on a first target subset corresponding to the first target grid block;

presenting a result of the first data analysis computation using a hardware device;

defining a first region and a second region on the graphical representation of the data set, wherein the grid is restricted to the first region;

defining, using a third gesture on the graphical representation of the data set, a second dimension;

defining, using the second dimension, a second shape on the graphical representation of the data set, wherein a second grid segments the second region of the graphical representation of the data set into a second plurality of subsets represented as a second plurality of grid blocks, wherein a subset in the second plurality of subsets corresponds to a grid block in the second plurality of grid blocks, wherein a second shape serves to define the bounds of the subset corresponding to a grid block in the second plurality of grid blocks, and wherein the shape and the second shape are distinct from one another;

making a fourth gesture relative to a first target grid block in the second plurality of grid blocks:

performing, responsive to the fourth gesture, a second data analysis computation on a second target subset corresponding to the first target grid block in the second plurality of grid blocks; and presenting a result of the second data analysis computation using the hardware device.

2. The method of claim 1, wherein the first gesture and the second gesture are parts of a common touch based gesture.

3. The method of claim 1, further comprising:

making a third gesture relative to a second target grid block in the plurality of grid blocks, wherein the third gesture includes transitioning from the first target grid block to the second target grid block;

performing, responsive to the third gesture, a second data analysis computation on a second target subset corresponding to the second target grid block; and presenting a result of the second data analysis computation using the hardware device.

4. The method of claim 3, wherein the first target grid block and the second target grid block are adjacent to one another.

5. The method of claim 3, wherein the first target grid block and the second target grid block overlap at least partially.

6. The method of claim 1, wherein the first gesture is a touch based gesture, made when a user touches the graphical rendering of the data set on a display device associated with the data processing system.

7. The method of claim 6, further comprising:

defining using a third gesture a second dimension, wherein the shape further uses the second dimension.

8. The method of claim 7, wherein the first gesture and the third gesture are parts of a common touch based gesture.

9. The method of claim 7, wherein the first gesture is a width of a finger used to make the first gesture, and wherein the third gesture is a pressure of the finger on the display device.

10. The method of claim 6, wherein the first gesture comprises using plurality of fingers to make the touch based gesture, and the first dimension is a distance between touch points of two of the plurality of the fingers.

11. The method of claim 1, wherein the first gesture is a pointer based gesture, made when a user manipulates a pointing device to select a plurality of points on the graphical rendering of the data set.

12. The method of claim 11, wherein the first dimension is a distance between at least two of the plurality of the plurality of the points.

13. The method of claim 1, wherein the presenting comprises outputting the result in audio form.

14. A computer usable program product comprising a computer usable storage device including computer usable code for data analysis using gestures, the computer usable code comprising:

computer usable code for determining, using a first gesture on a graphical representation of a data set rendered by an application executing on a data processing system, a first dimension;

computer usable code for defining, using the first dimension, a shape on the graphical representation of the data set;

computer usable code for segmenting, using a grid, the graphical representation of the data set into a plurality of subsets;

computer usable code for representing each subset in the plurality of subsets as a grid block in a plurality of grid blocks, wherein a particular subset in the plurality of subsets corresponds to a particular grid block in the plurality of grid blocks;

computer usable code for representing a visual shape of each grid block in the plurality of grid blocks in the form of said shape, said shape defining bounds of the corresponding subset of the data set, wherein said shape is configured to receive a gesture input and perform an analytical operation on data within the bounds of the subset;

computer usable code for making a second gesture relative to a first target grid block in the plurality of grid blocks;

computer usable code for performing, responsive to the second gesture, a first data analysis computation on a first target subset corresponding to the first target grid block;

computer usable code for presenting a result of the first data analysis computation using a hardware device;

computer usable code for defining a first region and a second region on the graphical representation of the data set, wherein the grid is restricted to the first region;

computer usable code for defining, using a third gesture on the graphical representation of the data set, a second dimension;

computer usable code for defining, using the second dimension, a second shape on the graphical representation of the data set, wherein a second grid segments the second region of the graphical representation of the data set into a second plurality of subsets represented as a second plurality of grid blocks, wherein a subset in the second plurality of subsets corresponds to a grid block in the second plurality of grid blocks, wherein a second shape serves to define the bounds of the subset corresponding to a grid block in the second plurality of grid blocks, and wherein the shape and the second shape are distinct from one another;

computer usable code for making a fourth gesture relative to a first target grid block in the second plurality of grid blocks;

computer usable code for performing, responsive to the fourth gesture, a second data analysis computation on a second target subset corresponding to the first target grid block in the second plurality of grid blocks; and computer usable code for presenting a result of the second data analysis computation using the hardware device.

15. The computer usable program product of claim 14, wherein the first gesture and the second gesture are parts of a common touch based gesture.

16. The computer usable program product of claim 12, wherein the computer usable code is stored in a computer readable storage medium in a data processing system, and wherein the computer usable code is transferred over a network from a remote data processing system.

17. The computer usable program product of claim 12, wherein the computer usable code is stored in a computer readable storage medium in a server data processing system, and wherein the computer usable code is downloaded over a network to a remote data processing system for use in a computer readable storage medium associated with the remote data processing system.

18. A data processing system for data analysis using gestures, the data processing system comprising:

a storage device, wherein the storage device stores computer usable program code; and a processor, wherein the processor executes the computer usable program code, and wherein the computer usable program code comprises:

computer usable code for determining, using a first gesture on a graphical representation of a data set rendered by an application executing on a data processing system, a first dimension;

computer usable code for defining, using the first dimension, a shape on the graphical representation of the data set;

computer usable code for segmenting, using a grid, the graphical representation of the data set into a plurality of subsets;

computer usable code for representing each subset in the plurality of subsets as a grid block in a plurality of grid blocks, wherein a particular subset in the plurality of subsets corresponds to a particular grid block in the plurality of grid blocks;

computer usable code for representing a visual shape of each grid block in the plurality of grid blocks in the form of said shape, said shape defining bounds of the corresponding subset of the data set, wherein said shape is configured to receive a gesture input and perform an analytical operation on data within the bounds of the subset;

computer usable code for making a second gesture relative to a first target grid block in the plurality of grid blocks;

computer usable code for performing, responsive to the second gesture, a first data analysis computation on a first target subset corresponding to the first target grid block;

computer usable code for presenting a result of the first data analysis computation using a hardware device;

computer usable code for defining a first region and a second region on the graphical representation of the data set, wherein the grid is restricted to the first region;

computer usable code for defining, using a third gesture on the graphical representation of the data set, a second dimension;

computer usable code for defining, using the second dimension, a second shape on the graphical representation of the data set, wherein a second grid segments the second region of the graphical representation of the data set into a second plurality of subsets represented as a second plurality of grid blocks, wherein a subset in the second plurality of subsets corresponds to a grid block in the second plurality of grid blocks, wherein a second shape serves to define the bounds of the subset corresponding to a grid block in the second plurality of grid blocks, and wherein the shape and the second shape are distinct from one another;

computer usable code for making a fourth gesture relative to a first target grid block in the second plurality of grid blocks;

computer usable code for performing, responsive to the fourth gesture, a second data analysis computation on a second target subset corresponding to the first target grid block in the second plurality of grid blocks; and computer usable code for presenting a result of the second data analysis computation using the hardware device.

* * * * *